Nov. 30, 1954  D. WOLLPERT ET AL  2,695,688
SCREW FASTENER
Filed May 5, 1950
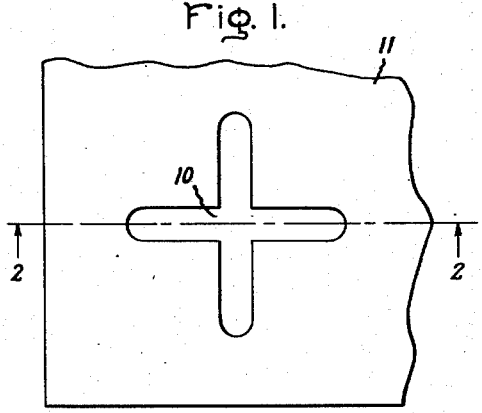
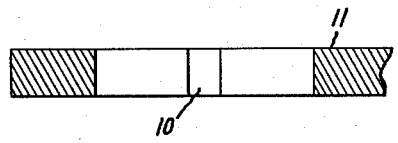
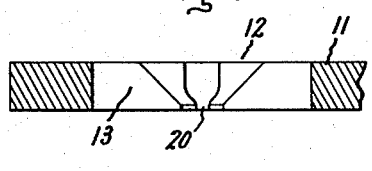
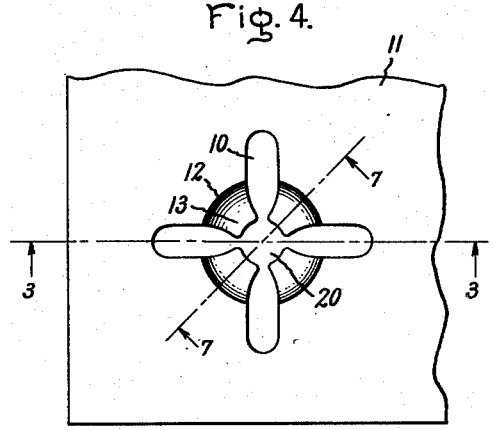
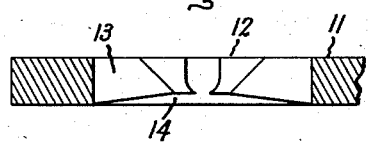
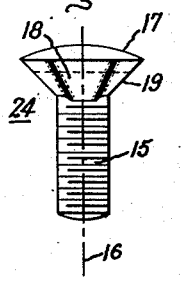
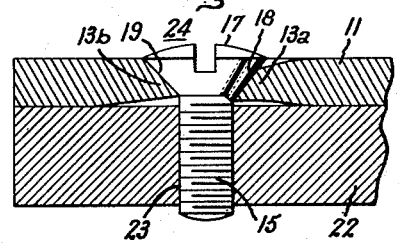
Inventor:
Daniel Wollpert,
Soren W. Lund,
by Claude A. Mott
His Attorney.

__ _United States Patent Office_ __

2,695,688
Patented Nov. 30, 1954

2,695,688

SCREW FASTENER

Daniel Wollpert and Soren W. Lund, Schenectady, N. Y., assignors to General Electric Company, a corporation of New York Application May 5, 1950, Serial No. 160,112

3 Claims. (Cl. 189—36)

This invention relates to screw fastening devices and, more particularly, to screw fastening devices utilizing tapered screw heads and countersunk depressions for receiving them.

The general object of our invention is to provide an improved, simplified, and low cost screw fastener.

A more specific object of the invention is the provision of a screw fastening device which is self-locking.

Another object of the invention is to provide an improved construction for a countersunk depression in a member which is to be secured to another member by means of a tapered head screw.

Another object is to provide an improved method for making such countersunk depressions.

A still further object of our invention is the provision of an improved construction for screws having tapered heads.

Other objects and advantages of our invention will become apparent from the following description, and the new and distinctive features which characterize it are pointed out in the appended claims.

In machinery of many types, it is important to have screws which can be locked to prevent their coming loose, particularly in machinary which must withstand considerable shock or vibration. Many arrangements have been proposed for the locking of such screws. That which is most widely accepted at the present time provides for the use of lock washers. Such washers take numerous shapes and usually are case hardened, while the screw is usually of softer metal so that the case hardened lock washer will deform the screw when the latter is tightened and thereby lock it.

This arrangement has the disadvantage that the screw may be stretched when it is tightened, due to the relatively low tensile strength of the soft metal. Furthermore, when the screw is subjected to heavy shock or vibration, the screw may stretch still further, allowing the lock washer to loosen and, in turn, allowing the screw to become loose.

The foregoing comments concerning the use of lock washers apply to screws of all types, but the problem is particularly acute with screws which have a tapered head to be received in a countersunk depression in one of the members to be fastened. This construction makes it necessary for the lockwasher to be tapered, which makes the lock washer more expensive and generally less satisfactory in performance.

We contemplate overcoming the disadvantages hereinbefore mentioned and eliminating lock washers entirely by the use of our invention. In carrying out our invention in one form, we provide a screw receiving opening in a flat metal member formed by a plurality of inwardly extending integral projections on the metal member. These centrally converging projections are all tapered to form a substantially conical countersunk depression on one surface of the member, thereby providing a plurality of fingers to grip the tapered screw head and provide locking action. Still further improved locking action is provided by using with such a countersunk member a screw having an eccentric portion on the tapered part of the head.

Our invention also includes an improved method of making such countersunk holes formed of a plurality of tapered inwardly extending integral projections on a flatly disposed metal member.

For a clearer and more complete understanding of our invention, reference should be had to the accompanying drawing in which:

Fig. 1 is a partial top view of a flat metal member on which the first operation of our improved method of making countersunk holes has been performed;

Fig. 2 is a side view, in section, of the member shown in Fig. 1, looking in the direction of the arrows along the line 2—2 in this figure;

Fig. 3 is a side view, in section, of the same member after an additional operation has been performed;

Fig. 4 is a top view of the member in the form shown in Fig. 3;

Fig. 5 shows a sectional view of a similar flat metal member on which an additional operation has been performed which provides further improved features;

Fig. 6 illustrates a screw having an eccentric portion on the head in accordance with our invention; and Fig. 7 shows a screw such as that in Fig. 6 positioned in a countersunk screw receiving opening such as that shown in Fig. 5, and illustrates the locking action provided by our invention.

In the manufacture of flatly disposed metal members which are to be secured to other members by means of screws, it is generally the practice to place a large blank of the metal to be used in a punch press. First, the holes where screws are to be located are punched from the blank and then the member itself, including the holes, is punched from the blank, both operations commonly being performed in a single punch press automatically without the blank being removed from the press between operations. Later, if the holes are to be countersunk, the member is placed in a drill press and the holes are countersunk by drilling. We propose to eliminate the drilling operation entirely and countersink the holes with the punch press. This entails an additional punch press operation, but this is generally far less expensive than the separate drill press operation, particularly in the case of automatic punch presses, many of which can execute three punching operations as readily as two with very little additional preparation and with no additional time required.

In carrying out our invention in a preferred form, we first punch out of a flat metal member 11 a piece of metal of a configuration which will leave a star-shaped aperture 10, as illustrated in Fig. 1 of the drawing. We have found that a four-pointed star, as illustrated in this figure, is the most satisfactory for most operations; however, it will be understood that our invention is not limited to such a configuration. Any configuration may be used which provides an aperture with outwardly disposed spaced apart extensions which provide for the later flow of excess metal from the intervening metal projections during the subsequent countersinking operation. A side view in section along the line 2—2 of Fig. 1 is shown in Fig. 2 of the drawing.

It should be understood that aperture 10 ultimately will provide a substantially circular countersunk screw receiving opening after further operations are performed on it, while member 11 may be a piece of metal which is punched out of a larger blank after the countersinking operations hereinafter described are completed.

The next step in the formation of the countersunk screw receiving aperture is illustrated in Figs. 3 and 4 of the drawing, Fig. 3 being a side view, in section, along the line 3—3 of Fig. 4. The shape illustrated in these two figures is achieved by stamping the flat metal member 11 with a substantially conical die which is centered in aperture 10. This operation provides a substantially circular screw receiving opening 20 having a tapered screw head receiving portion 12 formed by a plurality of tapered fingers, or projections, 13 integral with member 11 and converging radially inward toward the center of the opening 20.

It will be noted that the excess metal resulting from the formation of the taper on centrally converging projections 13 flows into the adjoining spaces, so that the thickness of member 11 is not affected by this operation.

We have found that when a screw having a tapered head is used with a countersunk opening of our invention, as illustrated in Figs. 3 and 4, that the screw is self-locking. This, apparently, is due principally to two things: (1) the finger gripping action exerted by the tapered projections 13 on the screw, and (2) the fact that these projections 13 are more resilient than the remainder of member 11. The latter property allows the projections 13 to flex individually with respect to the member 11 when the member 11 is subjected to high shock and then regain their original position without losing their grip on the screw. Our invention is particularly adaptable for use with case hardened screws, and the increased tensile strength provided by such screws means that they are much less likely to stretch during vibration or shock. Alternatively, the same tensile strength can be secured with a much smaller case hardened screw than with a corresponding screw which has not had this treatment, thereby providing a reduction in size and cost of screws.

A further refinement of our invention is illustrated in Fig. 5 of the drawing. In this case, the member 11 is provided with a larger shallow depression 14 on the surface opposite depression 12 in the countersunk surface. This is made by providing the projections 13 with a taper on this surface, as well as on the other surface. This additional depression conveniently can be provided simultaneously with the countersunk depression 12 merely by providing a raised insert in the lower die of the punch press when the countersunk depression is being formed. The additional depression 14 provides a space in which projections 13 can be deflected towards the member which is being joined to member 11 when the screw is tightened, and the construction illustrated in Fig. 5 is particularly advantageous when a screw with an eccentric portion on the head, as described below, is used, although it is useful also with a conventional screw.

In Fig. 6 of the drawing is illustrated a screw 24 having a conventional cylindrical threaded body portion 15 which is concentric about the longitudinal axis 16, and a tapered head portion 17. The under tapered surface of the head 17 is eccentric with respect to center line 16; that is, the portion 18, for example, may be at a greater distance or at a different angle than the remainder of the tapered surface 19 with respect to axis 16, the surface 19 preferably being frustoconical. It should be understood that such a screw is not appreciably more expensive nor more difficult to manufacture than a conventional screw having a concentric head, because most screws are manufactured at the present time by first drop forging the blank from which they are made and then rolling on the threads. In the quantity production of screws at the present time, a lathe is not used for either the threads or the head. Therefore, the only change which is necessary in present day manufacturing operations to produce a screw as illustrated in Fig. 6 is a slight change in the die for the head 17.

When a screw having an eccentric portion on the head, such as that illustrated in Fig. 6, is used with the countersunk screw receiving aperture of our invention, an improved locking action is provided, because the screw head tends to deform one or more of the tapered projections 13 differently than the other projections and thus prevent the screw from loosening with heavy shock or vibration. This is illustrated in Fig. 7 of the drawing, which is a sectional view along a line through the center of the screw receiving opening and through two projections 13, as illustrated by the line 7—7 in Fig. 4. It should be noted, however, that the screw receiving aperture shown in Fig. 7 is similar to that in Fig. 5, in that it includes a depression 14 on the under side of member 11.

Fig. 7 illustrates screw 24 securing member 11 to a second member 22 which is provided with a tapped hole 23. It will be seen in this figure that a projection 13a on one side of the screw receiving opening is deflected downward a greater amount by the projecting eccentric portion 18 on the head of the screw than the opposite projection 13b, thereby providing improved locking action. It will be understood, however, by those skilled in the art that the locking action is not necessarily limited to the particular arrangement illustrated in Fig. 7. It may not be readily apparent to an observer which one or more of the projections has been deformed when the screw is tightened; nevertheless, we have found that the countersunk screw receiving aperture of our invention provides self-locking action with conventional tapered head screws, and improved self-locking action with screws having eccentric portions on the heads.

Improved self-locking action is obtained also with either type of head by using a screw head which has more taper than the taper of the countersunk depression so that the screw head engages first the inner tips of projections 13 and forces them downward before the remainer of the screw head comes in contact with the projections.

Our invention provides an improved screw fastening means which is self-locking but at the same time may be readily disassembled, with substantially the same effort being required to loosen the screw as was originally used to tighten it, assuming, of course, that there has been no rusting or other adverse changes in the screw and the members which it secures together. Our invention also provides an improved method for making countersunk screw receiving apertures as hereinbefore described, and an improved construction for tapered screw heads for use in such apertures.

While we have illustrated and described certain preferred embodiments of our invention, modifications thereof will occur to those skilled in the art and, therefore, it should be understood that we intend to cover by the appended claims any such modifications which fall within the true spirit and scope of our invention.

What we claim as new and desire to secure by Letters Patent of the United States is:

1. Fastening means comprising an elongated, headed fastening device having a generally cylindrical threaded shank portion, for interengagement with a correspondingly tapped member, an enlarged head portion and a conically tapered seating portion joining said shank portion and said enlarged head portion, a flat sheet-metal member having a generally star-shaped aperture therein for receiving said fastening device and having a plurality of circumferentially spaced, inwardly directed radial projections defining said generally star-shaped aperture, said projections being conically tapered on the portion thereof defining the central portion of said aperture, said taper extending substantially completely between opposite major surfaces of said flat sheet-metal member, said tapered surfaces of said spaced projections forming a generally conical seating recess for receiving and securely holding said conically tapered seating portion of said fastening device when drawn thereto by the interengagement of said threaded shank portion with said tapper member.

2. Fastening means as defined in claim 1, said projections being tapered on a second surface thereof generally parallel to the plane of said flat sheet-metal member, and on the side thereof toward which said first-mentioned taper converges, whereby deflection of said projections in a direction generally perpendicular to the plane of said flat sheet-metal member is facilitated.

3. Fastening means as defined in claim 2, the said conically tapered seating portion of said headed fastening device having an enlarged eccentric portion for forcibly engaging said projections and for forcibly deflecting at least one of them in a direction generally perpendicular to the plane of said sheet-metal member.

References Cited in the file of this patent

UNITED STATES PATENTS

| Number | Name | Date |
| --- | --- | --- |
| 339,880 | Harman | Apr. 13, 1886 |
| 603,050 | Sargent | Apr. 26, 1898 |
| 684,673 | Clark | Oct. 15, 1901 |
| 711,823 | Cavallaro | Oct. 21, 1902 |
| 826,186 | McSpadden et al. | July 17, 1906 |
| 893,965 | Wooton | July 21, 1908 |
| 1,119,811 | Day | Dec. 8, 1914 |
| 1,322,624 | Rosenblatt | Nov. 25, 1919 |
| 1,903,785 | Lillig | Apr. 18, 1933 |
| 1,963,027 | Olson | Jan. 12, 1934 |